United States Patent
Orth

(10) Patent No.: US 9,478,214 B2
(45) Date of Patent: Oct. 25, 2016

(54) DEVICE AND METHOD FOR GENERATING NOISE FOR A MOTOR VEHICLE

(75) Inventor: Christoph Orth, Marbach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 191 days.

(21) Appl. No.: 14/003,482

(22) PCT Filed: Jan. 24, 2012

(86) PCT No.: PCT/EP2012/000294
§ 371 (c)(1),
(2), (4) Date: Sep. 6, 2013

(87) PCT Pub. No.: WO2012/119678
PCT Pub. Date: Sep. 13, 2012

(65) Prior Publication Data
US 2013/0343570 A1    Dec. 26, 2013

(30) Foreign Application Priority Data
Mar. 7, 2011 (DE) .......... 10 2011 001 121

(51) Int. Cl.
*H04B 1/00* (2006.01)
*G10K 15/04* (2006.01)
(Continued)

(52) U.S. Cl.
CPC .............. *G10K 15/04* (2013.01); *B60Q 5/008* (2013.01); *G10K 15/02* (2013.01)

(58) Field of Classification Search
CPC ...... G10K 15/02; G10K 15/04; H01R 11/01; H01R 11/09; H01R 11/12; H01R 4/34; H01R 4/64

USPC ....... 381/71.1–71.4, 94.1–94.4, 71.9, 61, 86; 340/445, 425.5
See application file for complete search history.

(56) References Cited

U.S. PATENT DOCUMENTS 4,943,956 A * 7/1990 Noro ............................ 367/137
5,635,903 A   6/1997 Koike et al.
(Continued)

FOREIGN PATENT DOCUMENTS

DE    199 45 259    1/2001
JP    05-011788     1/1993
(Continued)

OTHER PUBLICATIONS

Chinese Patent Application No. 2012800112650—Chinese Search Report ssued Aug. 18, 2014.
(Continued)

*Primary Examiner* — Lun-See Lao
(74) *Attorney, Agent, or Firm* — Gerald E. Hespos; Michael J. Porco; Matthew T. Hespos

(57) ABSTRACT

The invention relates to a device and method for generating noise for a motor vehicle, having at least one sensing unit (101), which is designed to measure at least one operating signal (11) of the motor vehicle and to forward a basic signal (12) on the basis thereof to a tuning unit (102), wherein the tuning unit (102) is designed to convert the basic signal (12) by means of filtering and acoustic shaping to form a noise signal (13) and to forward the noise signal (13) to an amplifier unit (103), wherein the amplifier unit (103) is designed to amplify the noise signal (13) and to forward an amplified noise signal (14) to a converter unit (104), and wherein the converter unit (104) is designed to convert the amplified noise signal (14) into corresponding acoustic signals in order to generate noise.

18 Claims, 3 Drawing Sheets

(51) Int. Cl.
*G10K 15/02* (2006.01)
*B60Q 5/00* (2006.01)

(56) References Cited

U.S. PATENT DOCUMENTS

| | | | |
|---|---|---|---|
| 7,203,321 | B1* | 4/2007 | Freymann et al. ............. 381/61 |
| 8,537,030 | B2* | 9/2013 | Perkins ................. B60Q 1/506 |
| | | | 340/425.5 |
| 2006/0093155 | A1* | 5/2006 | Fiori et al. ...................... 381/86 |
| 2006/0269078 | A1 | 11/2006 | Sakamoto et al. |
| 2007/0120658 | A1* | 5/2007 | Okubo ............... B60C 23/0433 |
| | | | 340/445 |
| 2008/0037803 | A1* | 2/2008 | Breed ............................. 381/86 |
| 2009/0080672 | A1* | 3/2009 | Smith ............................. 381/86 |
| 2009/0277707 | A1 | 11/2009 | Ballard |
| 2010/0266135 | A1 | 10/2010 | Theobald et al. |
| 2011/0010269 | A1* | 1/2011 | Ballard ..................... 705/26.41 |

FOREIGN PATENT DOCUMENTS

| | | |
|---|---|---|
| JP | 2000-316201 | 11/2000 |
| JP | 2009-292337 | 12/2009 |

OTHER PUBLICATIONS

Hinese Patent Application No. 2012800112650—Office Action issued Sep. 1, 2014.
International Search Report of Feb. 2013.

* cited by examiner

DEVICE AND METHOD FOR GENERATING NOISE FOR A MOTOR VEHICLE

BACKGROUND

1. Field of the Invention

The present invention relates to a device and a method for generating noise for a motor vehicle.

2. Description of the Related Art

US 2006/0269078 A1 discloses a combined noise/vibration control system for a motor vehicle having an active vibration damping apparatus and an active noise control apparatus.

In the combined noise/vibration control system described in said document, the active vibration damping apparatus and the active noise control apparatus exchange their respective control signals in respect of the noise and vibration prevailing in the motor vehicle, wherein the control signals are processed with weighting factors by a coordination unit which changes the frequencies output to the combined noise/vibration control system depending on the engine rotation frequency.

JP 2009-292337 A discloses an engine noise generation system which comprises a noise detection device, a noise generation device and a loudspeaker.

In the engine noise generation system described in said document, the noise generation system is switched on if the noise level which is generated by the engine falls below a threshold noise level. In this case, a noise of the engine is recorded by the noise detection device. The noise is then further amplified by the engine noise generation system.

US 2009/0277707 A1 discloses a device for simulating the sound of a conventionally driven petrol or diesel engine in an electrically operated motor vehicle having an electric drive motor. In this case, a sound generator which is supplied with several control parameters is used to generate desired engine noises.

JP 2000-316201 A discloses a noise generation device which is connected to the accelerator pedal of the motor vehicle by means of a noise generation monitoring device in order to generate artificial noises by means of an artificial sound controller and a loudspeaker system, in order to amplify the noise generation of an electric or hybrid vehicle.

JP 05011788 A describes a noise generation apparatus for the motor vehicle sector, wherein the noise generation apparatus amplifies electrical signals which are generated from signals of the vehicle control bus, and generates an electrical output signal which is further processed by the radio receiver of the motor vehicle.

One object of the present invention is to provide an improved device and an improved method for generating noise in a motor vehicle as an emotional and safety component for the driver and/or the area surrounding the driver, for example blind road users.

SUMMARY OF THE INVENTION

The invention provides a device for generating noise for a motor vehicle, having at least one recording unit which is designed to detect at least one operating signal of the motor vehicle and to forward a basic signal, which is formed on the basis of said operating signal, to a tuning unit, wherein the tuning unit is designed to reconfigure the basic signal by filtering and acoustic configuration to form a noise signal, and to forward the noise signal to an amplifier unit, wherein the amplifier unit is designed to amplify the noise signal and to forward an amplified noise signal to a transducer unit, and wherein the transducer unit is designed to convert the amplified noise signal into corresponding sound signals in order to generate noise.

The invention furthermore provides a method for generating noise for a motor vehicle, said method comprising the steps of: detecting at least one operating signal of the motor vehicle using at least one recording unit and forwarding a basic signal, which is formed on the basis of said operating signal, to a tuning unit, reconfiguring the basic signal using the tuning unit by means of filtering and acoustic configuration to form a noise signal, and forwarding the noise signal to an amplifier unit, amplifying the noise signal using the amplifier unit to form an amplified noise signal, and forwarding the amplified noise signal to a transducer unit, and converting the amplified noise signal into corresponding sound signals using the transducer unit.

The device according to the invention for generating noise for a motor vehicle and the corresponding method have the advantage that an emotional component can be provided for the driver and/or the area surrounding the driver during operation of the electric drive train.

In addition, an increased output of noise outside the vehicle can be registered as a warning by pedestrians. Furthermore, the driver is made more aware of the operating state of the electric drive train as a result of noise being output within the vehicle.

The concept on which the present invention is based is that of dispensing with artificial noise generation and generating noise solely and exclusively by advantageous amplification and filtering of signals which are recorded from the electric drive train in order to allow noise to be generated with a low level of expenditure on computation and storage.

In one advantageous development of the device, the at least one recording unit is an electroacoustic transducer for detecting sound. This allows direct conversion of air-borne sound of the drive components of the motor vehicle into corresponding electrical voltage changes as a basic signal.

In a further advantageous development of the device, the at least one recording unit is an electromagnetic sensor unit for detecting electromagnetic fields.

In a further advantageous development of the device, the at least one recording unit comprises at least one or more units of a car radio and is designed to detect electromagnetic fields.

In a further advantageous development of the device, the at least one recording unit is an electrical pick-up unit on a control bus, which pick-up unit is designed to detect control and data signals of an electric drive train.

In a further advantageous development of the device, the device has a plurality of recording units which are each connected to the tuning unit.

In a further advantageous development of the device, the at least one operating signal is interference which is caused by a high-voltage component of an electric drive train of the motor vehicle.

In a further advantageous development of the device, the at least one operating signal is a data signal of the motor vehicle.

In a further advantageous development of the device, the at least one operating signal is a sound signal of the motor vehicle.

In a further advantageous development of the device, the amplifier unit comprises at least one or more units of a car radio, wherein the amplifier unit is designed to amplify the noise signal.

In a further advantageous development of the device, the amplifier unit is an amplifier for AC voltages in the low-frequency range.

In a further advantageous development of the device, the transducer unit comprises a loudspeaker which is designed to convert the amplified noise signal into sound in order to generate noise.

In a further advantageous development of the device, the amplifier unit comprises at least one or more units of a car radio, wherein the amplifier unit is designed to amplify the noise signal.

In a further advantageous development of the device, the at least one recording unit is designed in such a way that electromagnetic fields in the FM and MW range can be detected.

The above refinements and developments can be combined with one another in any desired manner if expedient. Further possible refinements, developments and implementations of the invention also comprise combinations—not explicitly mentioned—of features of the invention described above and below in relation to the exemplary embodiments.

Exemplary embodiments of the invention are illustrated in the drawings and explained in greater detail in the following description.

DETAILED DESCRIPTION OF THE PREFERRED EMBODIMENTS

Figure 1:
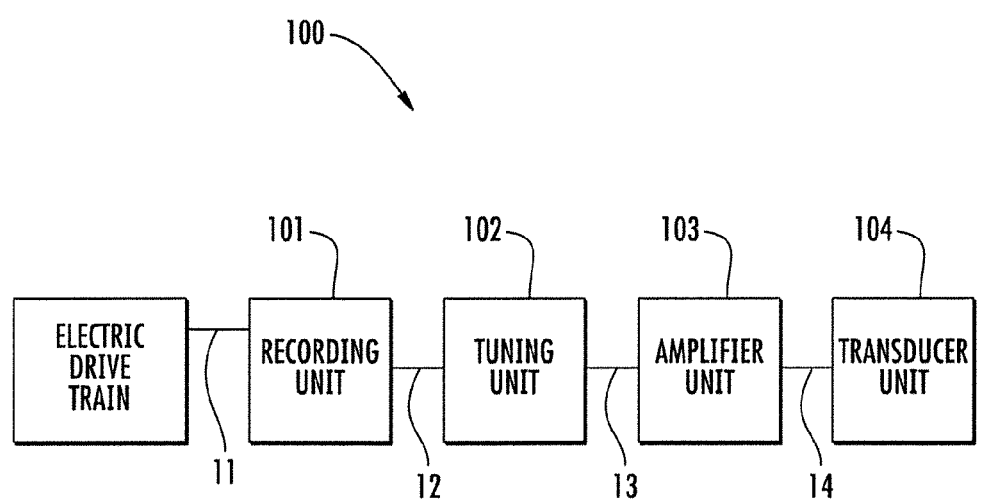
FIG. 1 shows a schematic illustration of the device for generating noise for a motor vehicle according to one exemplary embodiment of the present invention.

In the figures of the drawing, equivalent and functionally equivalent elements, features and components are—unless stated otherwise—respectively provided with the same reference signs. Components and elements are not necessarily reproduced true to scale in the drawings for reasons of clarity and intelligibility.

FIG. 1 shows a schematic illustration of a device 100 for generating noise for a motor vehicle according to one exemplary embodiment of the present invention.

The device 100 allows noise to be generated for a motor vehicle having an electric drive train, for example a hybrid and electric vehicle, and to this end comprises a recording unit 101, a tuning unit 102, an amplifier unit 103 and a transducer unit 104.

A clearly audible engine noise as an emotional component for the driver and as a warning for pedestrians is usually missing in the electric operating mode of a hybrid or electric vehicle.

The recording unit 101 of the device 100 is connected to the tuning unit 102. The tuning unit 102 is further connected to the amplifier unit 103 which is connected to the transducer unit 104.

The recording unit 101 detects an operating signal 11 which is used as a basis for generating noise, wherein a basic signal 12, which is formed on the basis of said operating signal, is forwarded to a tuning unit 102.

The operating signal 11 can comprise, for example, electromagnetic interference which is caused by high-voltage components of the electric drive train. In particular, the use of frequencies in the frequency modulation (FM) and/or medium wave (MW) range or other radio frequencies which are disturbed by the operation of the high-voltage components is provided for detecting the interference.

The high-voltage component of the electric drive train can be, for example, a power electronics system, a transducer, an electric motor or an electrical energy store.

In this case, it may be assumed, by way of example, that the recording unit 101 also uses components of a radio receiver or comprises a separate independent sensor unit in order to detect electromagnetic interference of the high-voltage components of the electric drive train.

This has the advantage that the type and manner of said interference and, therefore, of the detected operating signal 11 are dependent on the respective operating state of the electric drive train. This produces, as in a conventional internal combustion engine, a direct relationship between the noise which is generated by the device and the current operating state of the electric vehicle drive in a simple manner.

The recording unit 101 is, for example, designed as an electroacoustic transducer in the form of a microphone or as an electromagnetic sensor unit for detecting electromagnetic fields.

Furthermore, the recording unit 101 can be designed as a direct electrical connection or in the form of an electrical pick-up unit on a control bus and be designed to detect control and data signals of an electric drive train.

The tuning unit 102 configures a noise signal 13 from the basic signal 12, which is received from the recording unit 101, by filtering and acoustic configuration of said noise signal being forwarded to the amplifier unit 103.

By way of example, the acoustic configuration and filtering can be designed on the basis of acoustic configuration criteria, which are stored in the tuning unit 102, and using radiophonics algorithms of a digital signal processor in order to acoustically optimize the basic signal 12.

The radiophonics algorithms serve to continuously process the basic signal 12 using the tuning unit 102, wherein, for example, dynamic compression or frequency filtering is performed on the basis of the stored sound configuration criteria for influencing the tone of the basic signal 12.

Furthermore, filtering and sound configuration of the tuning unit 102 can also be performed by analog components.

The tuning unit 102 can be designed as a filter as an electronic component for sound configuration and for distorting and/or equalizing audio frequencies. The tuning unit 102 comprises, for example, a parametric equalizer, wherein one or more frequency bands, a center frequency and/or a change in amplitude of the basic signal 12 are varied.

The tuning unit 102 can also reconfigure the basic signal 12 as desired taking into account driving state parameters or an operating mode of the motor vehicle. For example, a more roaring noise signal 13 is generated in a sport operating mode than would be generated under the same driving state parameters in a city-driving operating mode.

The amplifier unit 103 amplifies the noise signal 13 which is received by the tuning unit 102 and forms an amplified noise signal 14. The amplifier unit 103 used can be, for example, an audio amplifier of a car radio. By way of example, a separate amplifier is used as the amplifier unit 103.

It is further possible for noise to be output by the transducer unit 104, wherein the transducer unit 104 is designed, for example, as a loudspeaker or a pair of loudspeakers which is/are provided inside and/or outside the vehicle.

Figure 2:
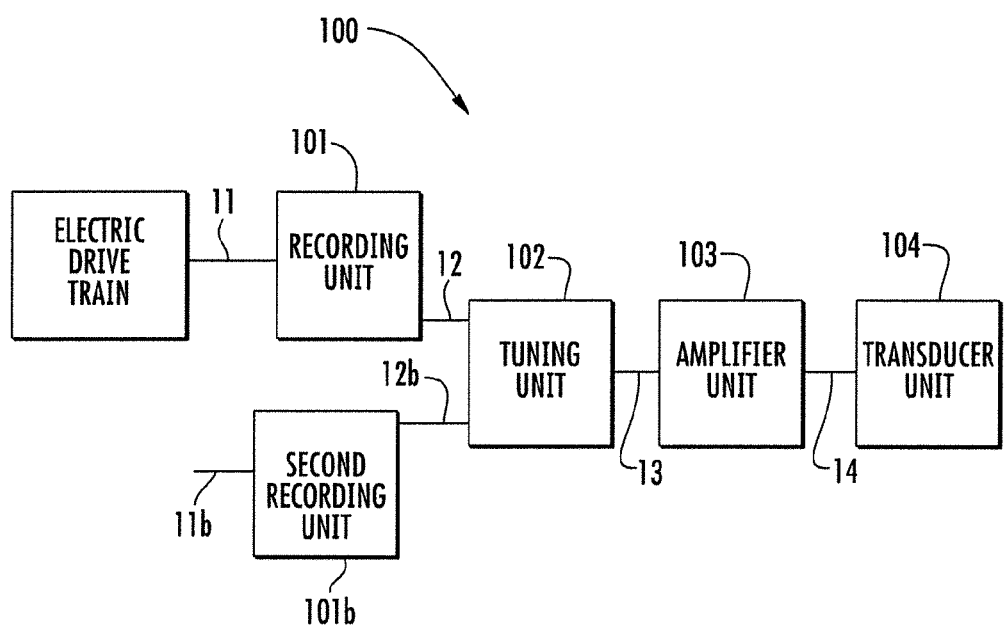
FIG. 2 shows a schematic illustration of the device for generating noise for a motor vehicle according to a further exemplary embodiment of the present invention.

FIG. 2 shows a schematic illustration of the device 100 for generating noise for a motor vehicle according to a further exemplary embodiment of the present invention.

In the device 100 according to the exemplary embodiment illustrated in FIG. 2, provision is made for the device 100 to have, in addition to the recording unit 101, a further recording unit 101b which detects a further operating signal 11b and forwards a further basic signal 12b, which is formed on the basis of said further operating signal, to the tuning unit 102.

This leads to an increased level of operational reliability of the device 100 being achieved substantially by redundant use of two recording units 101, 101b. Therefore, the operating state of the electric drive train is also known with an increased level of accuracy by virtue of measuring the operating signals 11, 11b.

In addition to the shown use of two recording units 101, 101b, it is also possible, for example, to use more than two recording units in order to simultaneously detect a plurality of operating signals. If a plurality of recording units are coupled, it may be expedient to compare the different operating signals and to identify malfunctions in individual recording units.

The reference signs in FIG. 2 which have not yet been cited are already explained in the description of FIG. 1.

Figure 3:
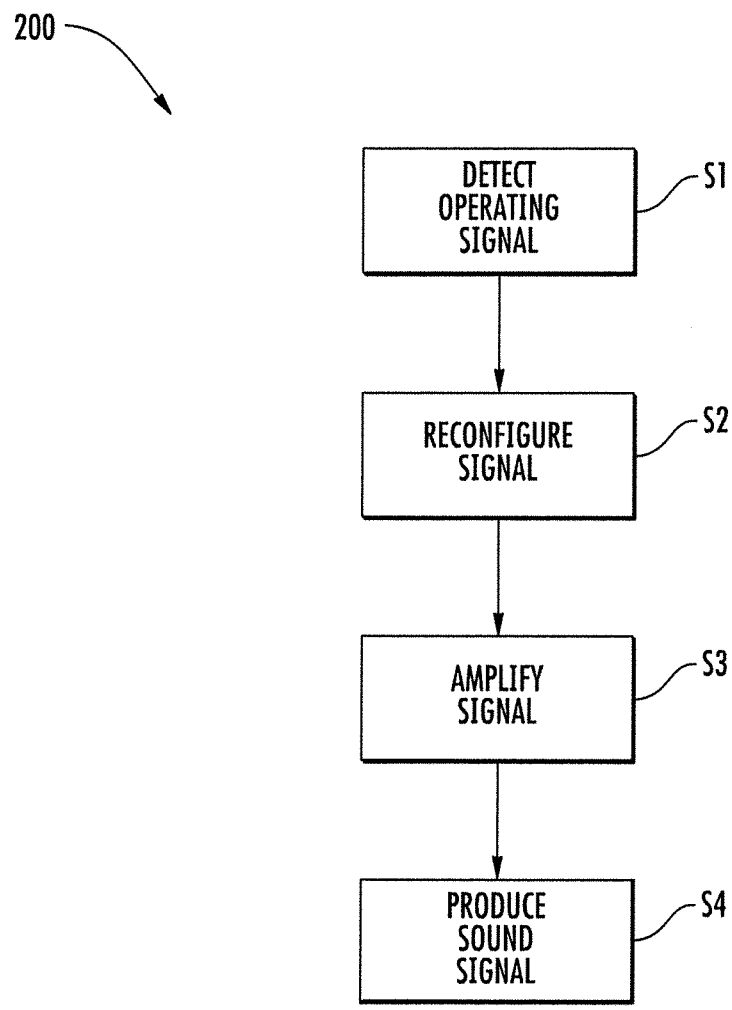
FIG. 3 shows a flowchart for illustrating a method for generating noise for a motor vehicle according to a further exemplary embodiment of the present invention.

FIG. 3 shows a flowchart for illustrating a method 200 for generating noise for a motor vehicle according to a further exemplary embodiment of the present invention. The method 200 for generating noise for a motor vehicle is executed by the device 100.

In a first step S1 of the method for generating noise for a motor vehicle, detection of at least one operating signal 11 of the motor vehicle is executed by at least one recording unit 101, wherein a basic signal 12, which is formed on the basis of said operating signal, is forwarded to a tuning unit 102.

In a second step S2 of the method, the basic signal 12 is reconfigured by the tuning unit 102 by means of filtering and acoustic configuration in order to form a noise signal 13, and the noise signal 13 is further forwarded to an amplifier unit 103.

In a third step S3 of the method, the noise signal 13 is amplified by the amplifier unit 103 to form an amplified noise signal 14, and the amplified noise signal 14 is forwarded to a transducer unit 104.

In a fourth step S4 of the method, the amplified noise signal 14 is converted into corresponding sound signals by the transducer unit 104.

The invention claimed is:

1. A device for generating noise for a hybrid or electric motor vehicle that has an electric drive train for driving the hybrid or electric motor vehicle, the device for generating noise comprising:
at least one recording unit with a sensor to detect electromagnetic radiation produced by the electric drive train of the hybrid or electric motor vehicle when the electric drive train is operating to drive the hybrid or electric motor vehicle, the at least one recording unit producing a basic signal based at least partly upon the detected electromagnetic radiation produced by the electric drive train;
a tuning unit designed to receive the basic signal produced by the at least one recording unit and to reconfigure the basic signal to form a noise signal, the tuning unit reconfiguring the basic signal by filtering and acoustic configuration processes;
an amplifier unit designed to receive and amplify the noise signal; and
a transducer unit designed to convert the amplified noise signal into corresponding sound signals to generate driver-perceptible noise inside a cabin of the hybrid or electric motor vehicle indicating operation of the electric drive train and/or a pedestrian-perceptible noise outside the hybrid or electric motor vehicle for indicating a presence of the hybrid or electric motor vehicle while being driven by the electric drive train.

2. The device of claim 1, wherein the at least one recording unit further comprises an electroacoustic transducer for detecting sound.

3. The device of claim 1, wherein the at least one recording unit comprises at least one unit of a car radio designed to detect the electromagnetic radiation produced by the electric drive train.

4. The device of claim 1, wherein the at least one recording unit further comprises an electrical pick-up unit on a control bus, the pick-up unit being designed to detect control and data signals of the electric drive train.

5. The device of claim 1, wherein the at least one recording unit comprises a plurality of recording units, the recording units each being connected to the tuning unit.

6. The device of claim 1, wherein the electromagnetic radiation produced by the electric drive train comprises interference caused by a high-voltage component of the electric drive train.

7. The device of claim 1, wherein the at least one recording unit is further designed to detect a data signal of the hybrid or electric motor vehicle.

8. The device of claim 1, wherein the at least one recording unit is further designed to detect a sound signal of the hybrid or electric motor vehicle.

9. The device of claim 1, wherein the amplifier unit comprises at least one unit of a car radio, the amplifier unit being designed to amplify the noise signal.

10. The device of claim 1, wherein the amplifier unit is an amplifier for AC voltages in the low-frequency range.

11. The device of claim 1, wherein the transducer unit comprises a loudspeaker designed to convert the amplified noise signal into sound in order to generate noise.

12. The device of claim 1, wherein the transducer unit comprises at least one unit of a car radio, the transducer unit being designed to convert the amplified noise signal into sound in order to generate noise.

13. The device of claim 1, wherein the at least one recording unit is designed to detect electromagnetic fields by detecting disturbances of frequency modulation (FM) and medium wave (MW) signals caused by operation of the electric drive train.

14. A method for generating noise for a hybrid or electric motor vehicle that has an electric drive train for driving the hybrid or electric motor vehicle, said method comprising:
detecting electromagnetic radiation produced by the electric drive train of the hybrid or electric motor vehicle when the electric drive train is operating to drive the hybrid or electric motor vehicle;
recording the electromagnetic radiation produced by the electric drive train using at least one recording unit;
forming a basic signal on the basis of the recorded electromagnetic radiation;

forwarding the basic signal to a tuning unit;
reconfiguring the basic signal using the tuning unit by means of filtering and acoustic configuration to form a noise signal;
forwarding the noise signal to an amplifier unit;
amplifying the noise signal using the amplifier unit to form an amplified noise signal;
forwarding the amplified noise signal to a transducer unit; and
converting the amplified noise signal into corresponding sound signals using the transducer unit to produce driver-perceptible noise inside a cabin of the hybrid or electric motor vehicle indicating operation of the electric drive train and/or a pedestrian-perceptible noise outside the hybrid or electric motor vehicle for indicating a presence of the hybrid or electric motor vehicle while being driven by the electric drive train.

15. The method of claim 14, further comprising recording control and data signals of the electric drive train.

16. The method of claim 14, wherein the electromagnetic radiation produced by the electric drive train comprises interference caused by a high-voltage component of the electric drive train.

17. The method of claim 14, further comprising detecting at least one of a data signal and a sound signal of the hybrid or electric motor vehicle.

18. The method of claim 14, wherein detecting electromagnetic fields further comprises detecting disturbances of frequency modulation (FM) and medium wave (MW) signals caused by operation of the electric drive train.

* * * * *